US008590422B2

(12) United States Patent
Kao

(10) Patent No.: US 8,590,422 B2
(45) Date of Patent: Nov. 26, 2013

(54) COMBINATION OF BICYCLE CRANK AND SHAFT

(76) Inventor: Yu Sheng Kao, Tainan (TW)

( * ) Notice: Subject to any disclaimer, the term of this patent is extended or adjusted under 35 U.S.C. 154(b) by 514 days.

(21) Appl. No.: 12/897,406

(22) Filed: Oct. 4, 2010

(65) Prior Publication Data

US 2012/0079914 A1 Apr. 5, 2012

(51) Int. Cl.
*B62M 3/00* (2006.01)

(52) U.S. Cl.
USPC ........................................................ 74/594.1

(58) Field of Classification Search
USPC ............ 74/560, 594.1, 594.2, 594.4; 301/2.5; 280/259, 260
See application file for complete search history.

(56) References Cited

U.S. PATENT DOCUMENTS 652,865 A * 7/1900 Scovill ......................... 74/594.2
2006/0053962 A1* 3/2006 Chiang ........................ 74/594.1
2006/0288818 A1* 12/2006 Meggiolan .................. 74/594.1
2007/0241530 A1* 10/2007 Nonoshita et al. ............ 280/259

* cited by examiner

*Primary Examiner* — Vicky Johnson

(57) ABSTRACT

A crank has a connection portion with a connection recess defined therein which has an engaging recess, a reception recess and a reception groove. The engaging recess is located at a closed end of the connection recess and the reception recess is located at an opened end of the connection recess. The reception groove is located between the engaging recess and the reception recess. An axle has an engaging portion at an end thereof and the engaging portion is engaged with the engaging recess. A guide surface is defined in an outer periphery of the cylindrical body. A ring-shaped washer is mounted to the cylindrical body and securely fills into the reception groove and the gap between the axle and the reception recess.

7 Claims, 6 Drawing Sheets

COMBINATION OF BICYCLE CRANK AND SHAFT

FIELD OF THE INVENTION

The present invention relates to a bicycle crank having a connection portion which is a recess and an end of the axle is engaged with the recess.

BACKGROUND OF THE INVENTION

A conventional bicycle crank 10 is shown in FIG. 1 and generally includes a connection portion 11 through which a connection hole 12 is defined. A large-diameter groove 13 is defined in the inner periphery of the connection hole 12 and opens to the outside of the connection portion 11. The axle 14 has an end with an engaging portion 15 which has a larger diameter so as to be engaged with the groove 13. However, the end that has the engaging portion 15 is exposed to the outside of the connection portion 11 of the crank 10 so that dust, water can easily enter the opening 16 in the end of the axle 14. A cap 17 is then inserted into the opening 16 of the axle 14 to avoid the entry of the dust and water. However, the cap 17 obviously cannot make the crank 10 to be aesthetic as expected. And the cap 17 increases the cost.

FIG. 2 shows another bicycle crank 20 wherein the connection portion 21 has a connection hole 22 which is defined through the connection portion 21, and a flange 23 extends inward from the inner periphery of the connection hole 22. The axle 24 has its end contacting the inside of the flange 23 and a threaded hole 25 is defined in the end of the axle 24. A bolt 26 is threadedly connected to the threaded hole 25 to connect the axle 24 and the crank 20. However, the bolt 26 can be seen from outside of the crank 20. In addition, the threaded hole 25 and the bolt 26 increase the manufacturing cost of crank and the bolt 26 requires extra assembling step.

The present invention intends to provide the connection of a bicycle crank and an axle which is more secured to the crank and does not exposed from outside of the connection portion of the crank.

SUMMARY OF THE INVENTION

The present invention relates to a combination of bicycle crank and axle, and comprises a crank having a connection portion and a connection recess is defined in an inside of the connection portion. The connection recess has an engaging recess, a reception recess and a reception groove, wherein the engaging recess is located at a closed end of the connection recess and the reception recess is located at an opened end of the connection recess. A diameter of the reception recess is larger than that of the engaging recess. The reception groove is located between the engaging recess and the reception recess. A diameter of the reception groove is larger than that of the reception recess. An axle has a cylindrical body and an engaging portion which is located at an end of the cylindrical body and engaged with the engaging recess. A guide surface is defined in an outer periphery of the cylindrical body and connected to the engaging portion. The guide surface is located at the engaging recess when the engaging portion is engaged with the engaging recess. A ring-shaped washer is mounted to the cylindrical body and has a first end and a second end. The first end is guided by the guide surface and engaged with the reception groove. The second end is engaged between the cylindrical body and the reception recess.

The primary object of the present invention is to provide a connection of the crank and the axle wherein the end that the axle is connected to the crank is not exposed from outside of the crank and no bolt is needed.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
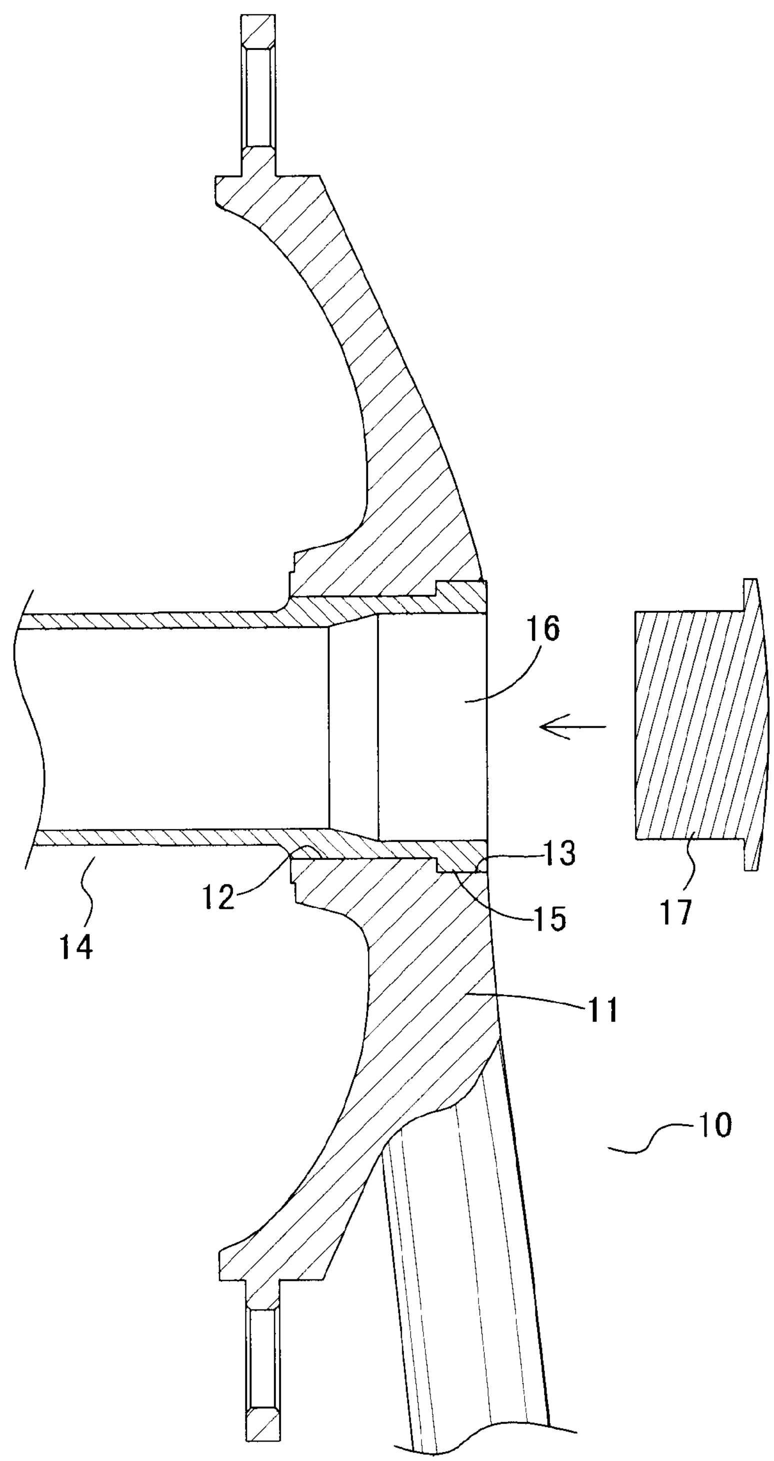
FIG. 1 is a partial cross sectional view to show the conventional crank and the conventional axle.
Figure 2:
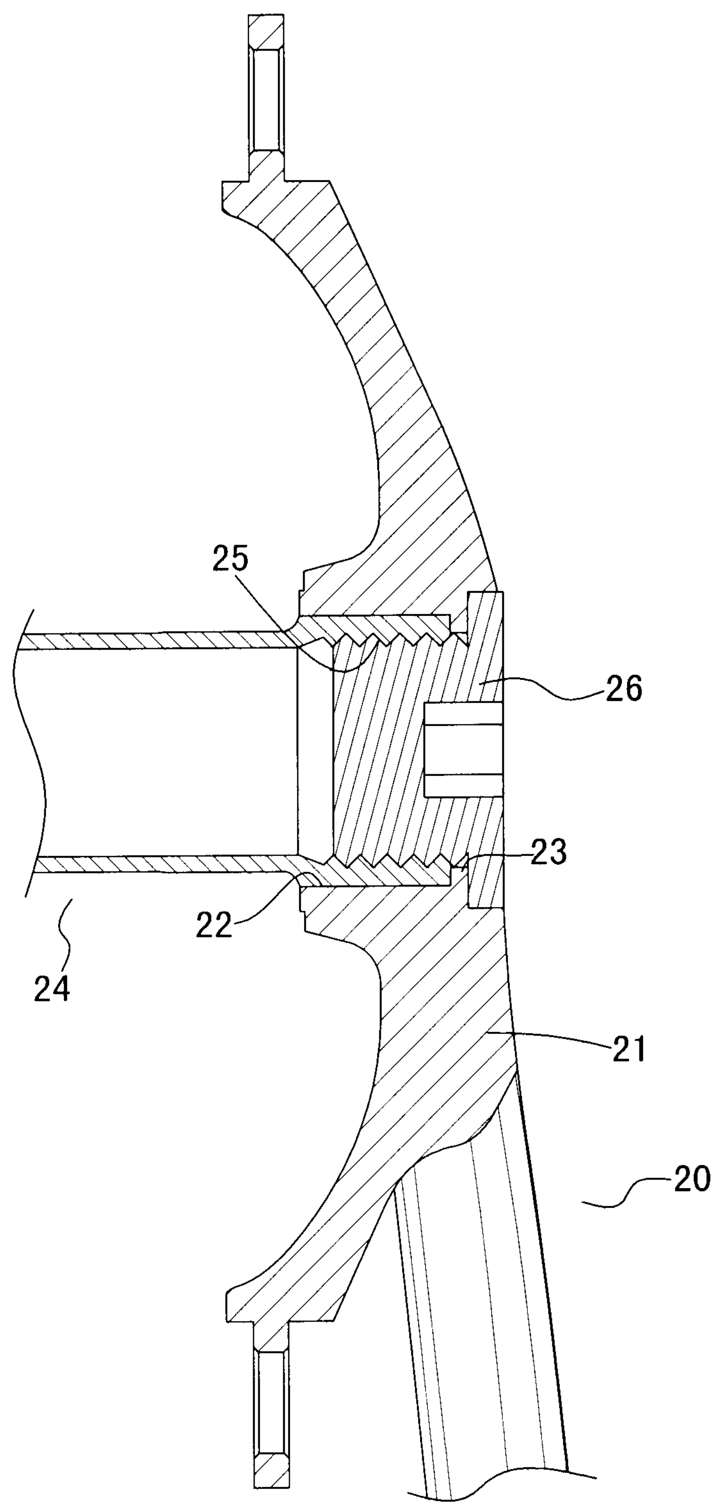
FIG. 2 is a partial cross sectional view to show another conventional crank and conventional axle.
Figure 3:
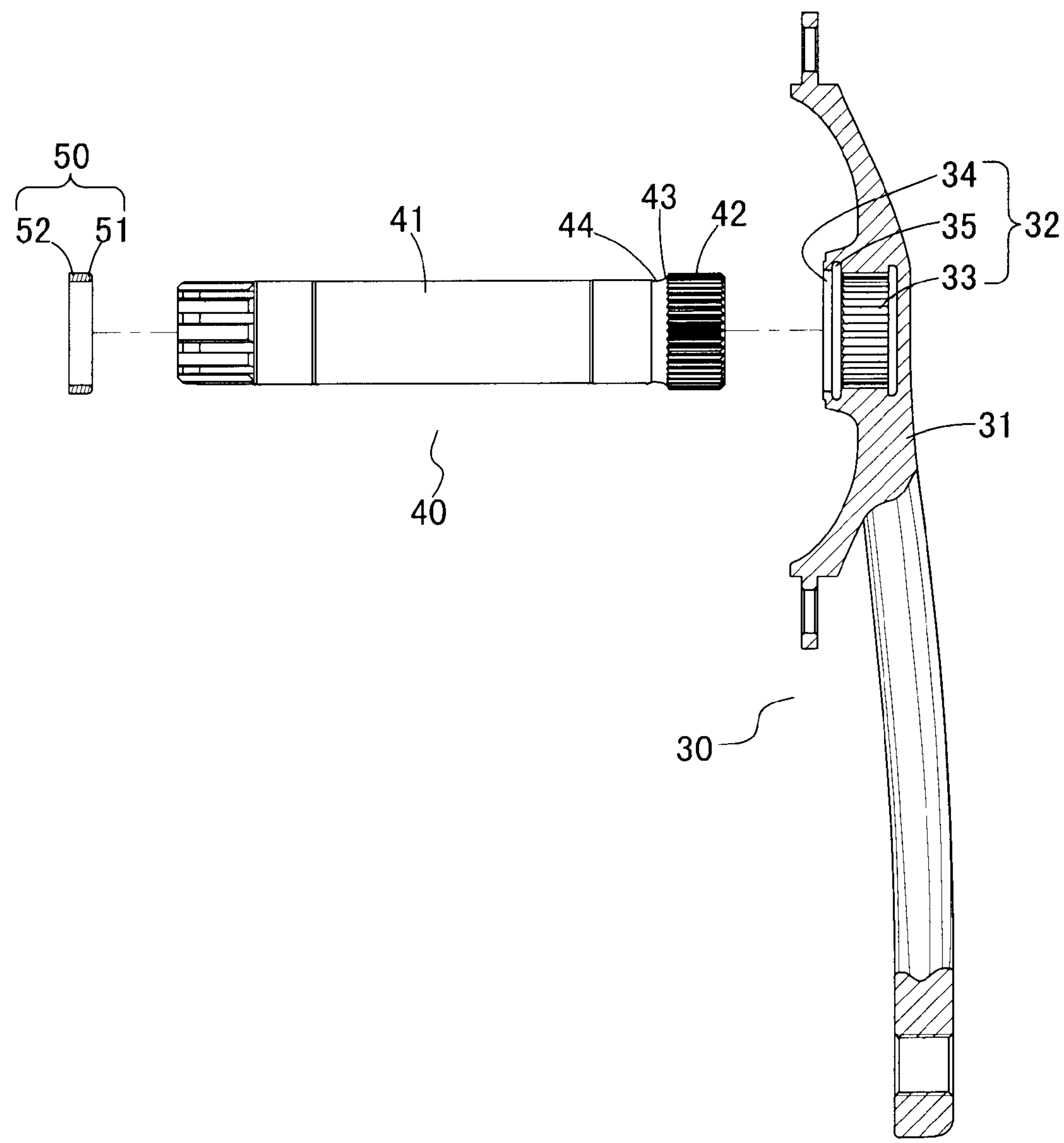
FIG. 3 shows the crank and the axle of the present invention.
Figure 4:
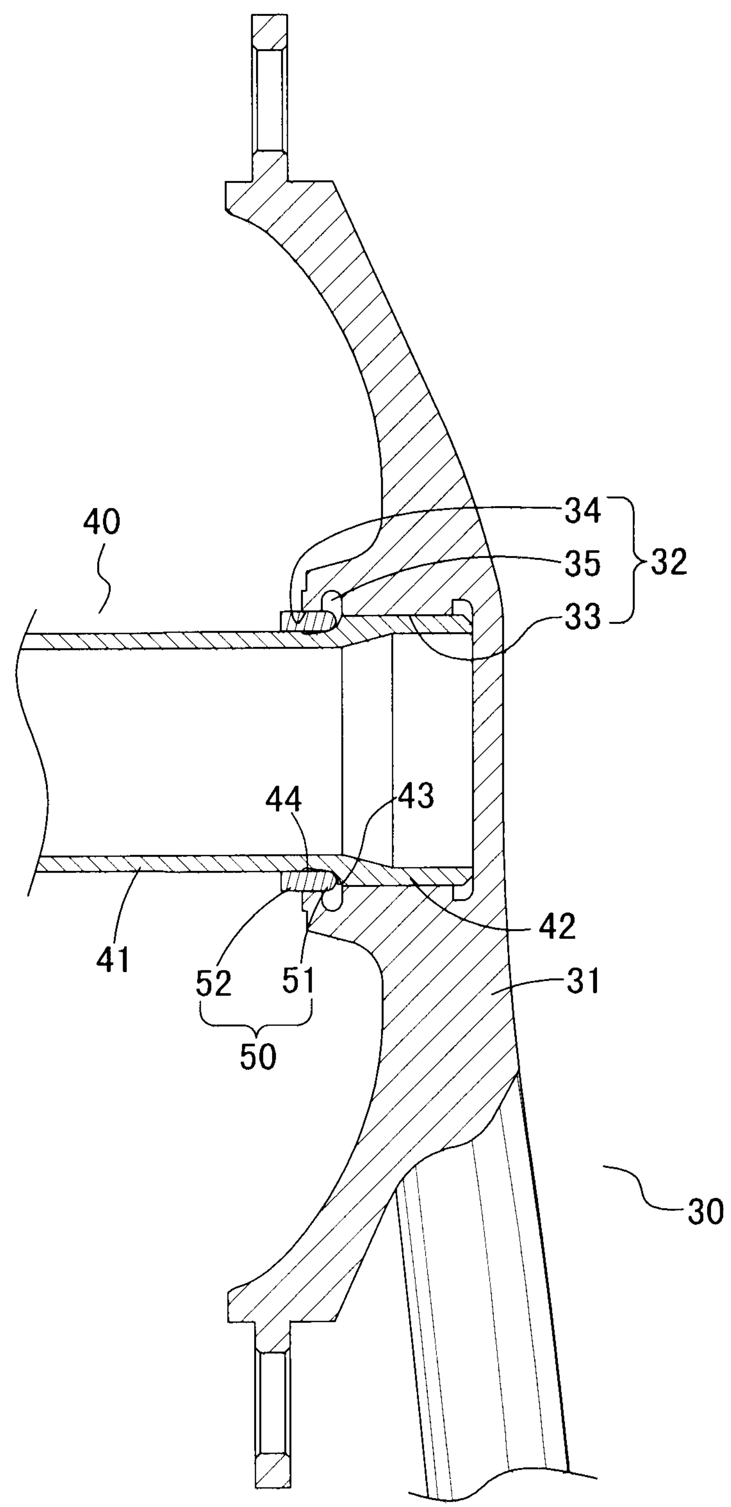
FIG. 4 is a cross sectional view of the connection of the crank and the axle of the present invention, wherein the washer is not yet positioned.
Figure 5:
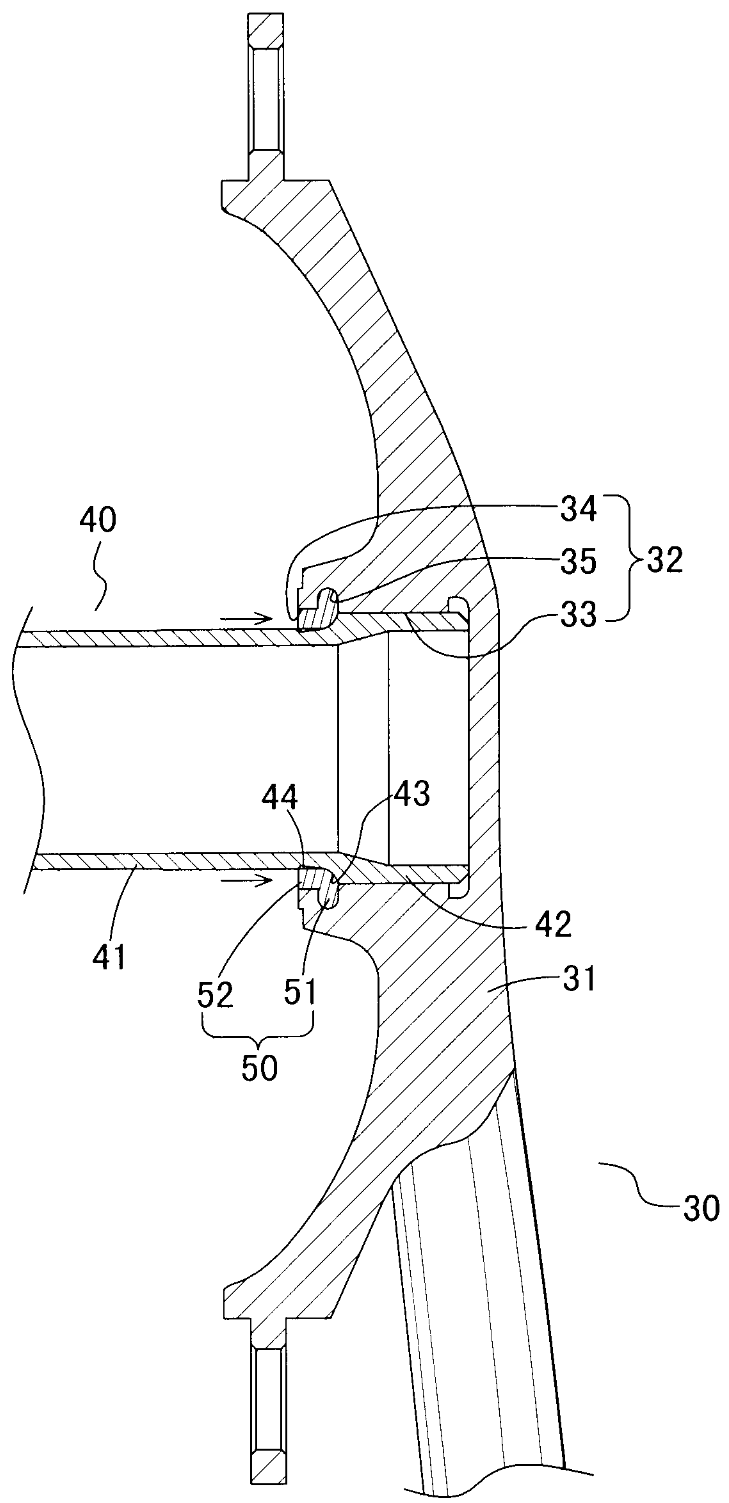
FIG. 5 is a cross sectional view of the connection of the crank and the axle of the present invention, wherein the washer is positioned.

Referring to FIGS. 3 to 5, the bicycle crank 30 of the present invention comprises a connection portion 31 and a connection recess 32 is defined in an inside of the connection portion 31. The connection recess 32 has an engaging recess 33, a reception recess 34 and a reception groove 35, wherein the engaging recess 33 is located at a closed end of the connection recess 32 and the reception recess 34 is located at an opened end of the connection recess 32. A diameter of the reception recess 34 is larger than that of the engaging recess 33. The reception groove 35 is located between the engaging recess 33 and the reception recess 34. A diameter of the reception groove 35 is larger than that of the reception recess 34. The engaging recess 33 has multiple ridges extending inward and axially from an inner periphery thereof.

An axle 40 has a cylindrical body 41 and an engaging portion 42, wherein the engaging portion 42 is located at an end of the cylindrical body 41 and engaged with the engaging recess 33. A guide surface 43 is defined in an outer periphery of the cylindrical body 41 and connected to the engaging portion 42. The guide surface 43 is located at the engaging recess 33 when the engaging portion 42 is engaged with the engaging recess 33. In this embodiment, the guide surface 43 is a curved surface. The engaging portion 42 of the axle 40 has multiple grooves with which the ridges are engaged. The cylindrical body 41 further has an annular groove 44 defined in an outer periphery thereof and the annular groove 44 is located close to the engaging portion 42.

A ring-shaped washer 50 made of Aluminum alloy or plastic steel is mounted to the cylindrical body 41 and has a first end 51 and a second end 52. The first end 51 of the washer 50 is a rounded end which is guided by the guide surface 43 and engaged with the reception groove 35. The second end 52 is engaged between the cylindrical body 41 and the reception recess 34 as shown in FIG. 4. The second end 52 of the washer 50 is located outside of the connection portion 31 and a press machine (not shown) is used to press the second end 52 of the washer 50, the first end 51 of the washer 50 is then guided by the guide surface 43 and engaged with the reception groove 35 and the second end 52 of the washer 50 is forced to fill the gap between the cylindrical body 41 and the reception recess 34. By this arrangement, the washer 50 restricts the engaging portion 42 within the engaging recess 33 to secure the axle 40 and the crank 30.

As shown in FIG. 5, the cylindrical body 41 has an annular groove 44 defined in the outer periphery thereof and the annular groove 44 is located close to the engaging portion 42. The washer 50 is engaged with the annular groove 44 and the guide surface 43 is located in the annular groove 44.

Figure 6:
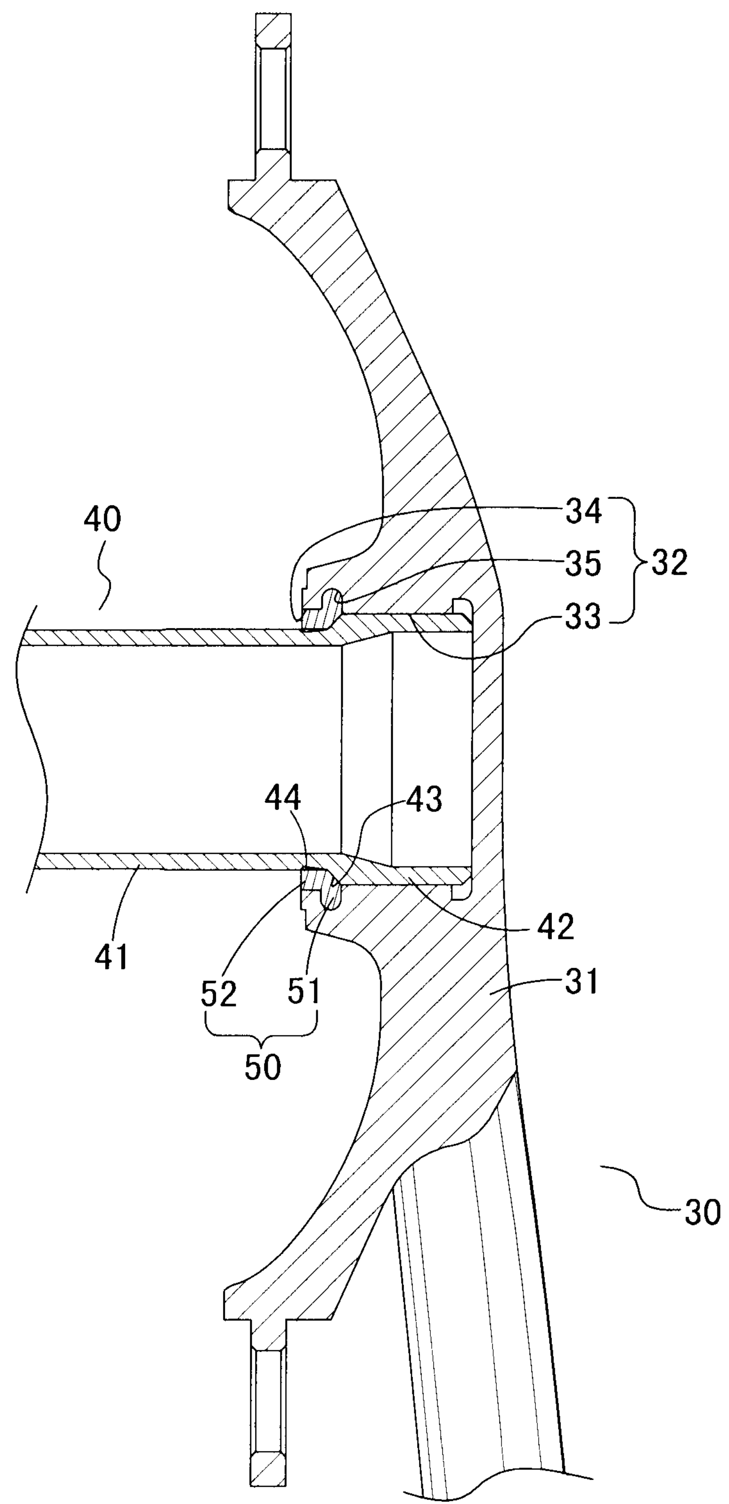
FIG. 6 shows a cross sectional view of the connection of the second embodiment of the crank and the axle of the present invention.

FIG. 6 shows a second embodiment of the present invention wherein the guide surface 43 is an inclined surface.

While we have shown and described the embodiment in accordance with the present invention, it should be clear to those skilled in the art that further embodiments may be made without departing from the scope of the present invention.

What is claimed is:

1. A combination of bicycle crank and axle, comprising:

a crank having a connection portion and a connection recess defined in an inside of the connection portion, the connection recess having an engaging recess, a reception recess and a reception groove, the engaging recess located at a closed end of the connection recess and the reception recess located at an opened end of the connection recess, a diameter of the reception recess being larger than that of the engaging recess, the reception groove located between the engaging recess and the reception recess, a diameter of the reception groove being larger than that of the reception recess;

an axle having a cylindrical body and an engaging portion, the engaging portion located at an end of the cylindrical body and engaged with the engaging recess, a guide surface defined in an outer periphery of the cylindrical body and connected to the engaging portion, the guide surface located at the engaging recess when the engaging portion is engaged with the engaging recess, the cylindrical body having an annular groove defined in the outer periphery thereof, the annular groove located at an end of the guide surface and being remote from the engaging portion, and a ring-shaped washer mounted to the cylindrical body and having a first end and a second end, the first end of the ring-shaped washer being guided by the guide surface and the reception groove being completely filled by the first end of the ring-shaped washer, the second end of the ring-shaped washer engaged between the cylindrical body and the reception recess, the second end of the ring-shaped washer being engaged with the annular groove.

2. The combination as claimed in claim 1, wherein the guide surface is a curved surface.

3. The combination as claimed in claim 1, wherein the guide surface is an inclined surface.

4. The combination as claimed in claim 1, wherein the engaging recess has multiple ridges extending inward from an inner periphery thereof and the engaging portion of the axle has multiple grooves with which the ridges are engaged.

5. The combination as claimed in claim 4, wherein the first end of the washer is a rounded end.

6. The combination as claimed in claim 4, wherein the washer is made of Aluminum alloy.

7. The combination as claimed in claim 4, wherein the washer is made of plastic steel.

* * * * *